(12) United States Patent
Ruckstuhl et al.

(10) Patent No.: US 7,695,196 B2
(45) Date of Patent: Apr. 13, 2010

(54) PLUG CONNECTOR SYSTEM AND PROTECTIVE DEVICE FOR OPTICAL PLUG CONNECTORS

(75) Inventors: Thomas Ruckstuhl, Wetzikon (CH); Giorgio Friedrich, Hettlingen (CH); Rolf Weber, Freienstein (CH)

(73) Assignee: Reichle & De-Massari AG, Wetzikon (CH)

( * ) Notice: Subject to any disclaimer, the term of this patent is extended or adjusted under 35 U.S.C. 154(b) by 5 days.

(21) Appl. No.: 12/015,003

(22) Filed: Jan. 16, 2008

(65) Prior Publication Data

US 2008/0175532 A1   Jul. 24, 2008

(30) Foreign Application Priority Data

Jan. 16, 2007   (CH) ..................................... 0063/07

(51) Int. Cl.
 *G02B 6/36* (2006.01)
(52) U.S. Cl. ............................ 385/55; 385/139; 385/75; 385/76
(58) Field of Classification Search ........................ None
See application file for complete search history.

(56) References Cited

U.S. PATENT DOCUMENTS 4,295,043 A * 10/1981 Eibner et al. ........... 250/227.24
4,919,508 A * 4/1990 Grace et al. .................... 385/56
5,875,275 A * 2/1999 Evans et al. .................... 385/88
6,424,758 B1   7/2002 Cheng
7,239,780 B2 * 7/2007 Notheis et al. ............... 385/100
2003/0169975 A1   9/2003 Anderson et al.
2004/0179787 A1   9/2004 Glazowski et al.
2009/0261955 A1* 10/2009 Moore et al. ............. 340/10.42

FOREIGN PATENT DOCUMENTS

| DE | 44 44 568 A1 | 6/1996 |
| DE | 103 51 773 B4 | 6/2004 |
| EP | 0 486 172 A1 | 5/1992 |
| EP | 1 168 019 A2 | 1/2002 |
| JP | 57-85014 | 5/1982 |

* cited by examiner

*Primary Examiner*—Sarah Song
(74) *Attorney, Agent, or Firm*—Rankin, Hill & Clark LLP

(57) ABSTRACT

An optical plug connector comprises a socket part, adapter part or coupling part with a socket housing for releasable connection to a plug part. An inside of the socket housing defines an inner space, into which a plug portion of the plug part may be introduced. Moreover, a switch device is present, by way of which a radiation power led to the plug part and/or the socket part, adapter part or coupling part (1) may be reduced or switched off when the plug connection is released. The switch device comprises a first element which is present or fastenable on the socket part, adapter part or coupling part, and a second element which is present or may be fastened on the plug part, wherein the switch device is actuated in that the first and the second element cooperate.

15 Claims, 3 Drawing Sheets

PLUG CONNECTOR SYSTEM AND PROTECTIVE DEVICE FOR OPTICAL PLUG CONNECTORS

BACKGROUND OF THE INVENTION

The invention relates to a plug connector system and to a protective device for an optical plug connector.

Data transmission via optical waveguides is becoming increasingly important. The data transmission rate is continuously increasing, and as a consequence the radiation (optical beam) power which is led via the fibre-optic connections is becoming larger and larger. In the meanwhile, the radiation beaming power has become so large, that the beam may irreparably damage the human eye. For this reason, the question concerning the safety of the user has become paramount, in particular with optical plug connections. Specifically, optical radiation may exit when the plug connection is separated.

Plugs and couplings are obtainable on the market, in which a so-called laser protection flap is integrated. When the plug connection is open, the radiation at the exit from the plug connection part is mechanically inhibited. However, the materials which may be applied for such protective flaps are increasingly reaching their burden limits, given an ever increasing laser power. The protective flaps suffer irreparable damage when the emitting lasts too long. Furthermore, the scatter radiation which is reflected at the protective flaps and scattered, and subsequently exits the plug connection part in an uncontrolled manner, may likewise be considerable. Safety additional to the protective flaps is likewise desirable.

It has already been suggested to provide a plug connector with a device, with which one ascertains as to whether the connection is open or not. When the plug is not inserted, the radiation source—generally a laser—is switched off. Such a measure is specified for example in the documents EP 1 237 024, U.S. Pat. No. 5,708,745 and DE 41 39 918.

The disadvantage with such plug connectors is the fact that the plug connection type needs to be redefined on account of the measure to be undertaken, and the plug connection is not compatible with standardised plug connectors. As a result, such a solution has not been successful on the market until now.

BRIEF SUMMARY OF THE INVENTION

It is the object of the invention to provide a solution here, and to provide an optical plug connector as well as a protective device for an optical plug connector, which overcome the disadvantages according to the state of the art, and which in particular permit a solution which ensures the compatibility with existing, standardised plug connections.

This object is achieved by the invention as is defined in the patent claims.

An optical plug connector system of the type according to the invention, comprises a socket part, adapter part or coupling part, with a socket housing on the one hand, as well as a plug part on the other hand. An inside of the socket housing defines an inner space into which a plug portion of the plug part may be inserted, by which means a releasable plug connection may be created between the one socket part, adapter part or coupling part, and the plug part. Moreover, a switch device is present, by way of which a radiation power led to the plug part and/or the socket part, adapter part or coupling part, may be reduced or switched off when the plug connection is released, in that corresponding information is transmitted from the switch device to the location of the radiation source. According to a first aspect of the invention, the switch device on the one hand comprises a first element which is present or fastenable on the socket part, adapter part or coupling part, and on the other hand a second element which is present or may be fastened on the plug part, wherein the switch device is actuated in that the first and the second element cooperate. Thereby, the second element is present or may be fastened retroactively on a portion of the plug part which is different to the plug portion.

A very effective operator protection is made possible by way of the approach according to the invention. The active components (radiation source) may be cut off immediately, or its power reduced to an extent which is not harmful, by way of a signal from the switch device. The switch device is connected to the radiation source or its control, preferably via electric wiring. The device may also be part of a safety system, which is distinguished by a unit connected in series. The feedback of the electrical signal is particularly preferably affected via transistor-transistor logic (TTL), since a very rapid cut-off or reduction of the power is ensured by way of this. The control of the radiation source is preferably designed such that the cut-off signal or reduction signal from the switch device over-controls all other commands.

Generally, an interruption of a fibre-optic connection is expensive. The down time (time without functioning) of the optical transmission may be reduced on account of the automatic alerting and power reduction or cut-off, which are made possible on account of the approach according to the invention.

Due to the fact that a second element is present at a location of the plug part which is different to the plug portion (i.e. at a location which is arranged in the axial direction such that the design of the socket part accommodating the plug is not dependent on the external dimensions of the second element), this plug portion may be designed according to existing plug connector types, and may also fit into socket parts, adapter parts or coupling parts which are not designed according to the invention. Apart from this compatibility, this also has the very significant advantage that the solution according to the invention may also be retrofitted. A retrofitting is effected for example by way of the fastening of the first element at the outside on the socket part, adapter part or coupling part, and the fastening of the second element on the plug part, and specifically behind (with respect to the insert direction) the plug portion as the part which is introduced into the socket and whose outer dimensions are therefore limited by the socket. The retrofitting may therefore be carried out on an existing system with a minimal down-time or possibly even without an interruption.

The invention thus makes use of the idea, according to which, the switch device acts essentially outside the inner space (the "socket opening"). The protective device may therefore also be fastened at a later stage according to requirements. Existing plug systems may accordingly be retrofitted in the simplest manner according to the required safety specifications. The plug connector system according to the invention may therefore correspond to a known plug connector system with the elements "switch device, first element, second element" additionally attached on the outside. The plug connector system preferably comprises additional locking means which are independent of the protective device system—as is the case with the known plug connection systems.

A protective device according to the invention, which may be designed as a retrofitting set or be supplied with the plug connector, accordingly comprises a switch device, by way of which a radiation power which is led to the plug part and/or the socket part, adapter part or coupling part, may be reduced or cut off, when the plug connection is released. It is characterised in that the switch device may be fastened on an outer side of the socket housing (or possibly also of the plug housing) and be actuated by way of inserting the plug part into the socket part, adapter part or coupling part.

According to a preferred embodiment, the switch device is actuated by way of the cooperation of a first element—for example a countersunk actuation projection of a mechanical switch, a Hall probe, an RFID-receiver or a photodiode—with a preferably passive second element—for example an abutment or counter-projection for the actuation projection, a permanent magnet, an RFID-tag (radio tag) or a reflector for a detection of radiation of low radiation power. Common to all these arrangements is the fact that, by way of the introduction of the plug into the socket, they permit the switch means to be actuated such that the release is affected automatically, without active actuation of an element, and the full radiation power is released. The reduction of the radiation power is also effected automatically on removal of the plug from the socket.

Furthermore, by way of these designs of the first and second actuation element, one also ensures that the switch device may only then be actuated without a tool, if the second element is present and the plug is introduced into the socket.

This embodiment has the advantage that the switch device acts independently of possibly present, further protective mechanisms, such as a protective flap for example. Therefore, one must actuate two independent mechanisms (switch device and protective flap), in order to circumvent the safety measures, and one may securely rule out this being done unintentionally or without thought.

According to an embodiment which is alternative to this, the switch device which may be fastened or is fastened at the outside on the socket part, adapter part or coupling, comprises an element acting quasi as a measurement probe, which projects into the inner space and is actuated by a protective flap, which is present in any case in the socket part, adapter part or coupling part. Such a protective flap, with plug connectors or different standards, prevents the exit of radiation given an opened plug connection, and may be moved by the plug part against a spring force. The element which projects into the inner space is preferably an actuation projection of a mechanical switch, for which, in the case of a retrofitting, only a small hole needs to be drilled into the housing of the socket part, adapter part or coupling part, in order to detect the position of the flap.

The switch device may be based on different principles, as previously mentioned. The design as a microswitch, i.e. as a small, mechanically actuated, electrical switch is particularly preferred. Such switches are examples of integrated, encapsulated components with an electrical output. Switches of this type are obtainable on the market. Such a switch is preferably not locking, i.e. it acts as a push-button switch, for the application in the context of the invention; and the radiation source may then be operative with the full power independently of the prior history, when an actuation element is held in a deflection position opposing a spring force. As soon as the plug connection is released, the actuation element returns into the idle position on account of the action of the spring force, and the radiation source is reduced or switched off, for example in that the electricity supply for the optical source is interrupted.

The actuation element may for example be arranged axially, i.e. it may be displaced roughly parallel to the plug axis. On inserting the plug part, it is actuated by a corresponding counter-piece on the plug part (an abutment or counter projection of the second element). Particularly preferably, the actuation element is countersunk, and the counter projection, in the inserted condition of the plug connector, engages into the inside of an opening. A coincidental, unintended actuation of the actuation element may be practically ruled out by way of this.

The switch device may also alternatively be based on different principles to those of a mechanically actuated switch, and for example function as a Hall-effect switch, an RFID-switch, as an optical switch, etc.

The idea according to the invention is particularly, but not only, advantageous in combination with the LSH-plug standard, since this envisages very compact plug connectors. Moreover, a stick-on portion, which is suitable for clipping on a passive element with a collar, exists on the plug part. The idea according to the invention however also functions with other plug connectors, such as for example the SC-connector, the BFOC-connector, the FC/PC-connector, the LC-connector or any other for example standardised plug connector.

BRIEF DESCRIPTION OF THE DRAWINGS

Embodiments of the invention are hereinafter explained in more detail by way of drawings.

DETAILED DESCRIPTION OF THE INVENTION

Figure 1:
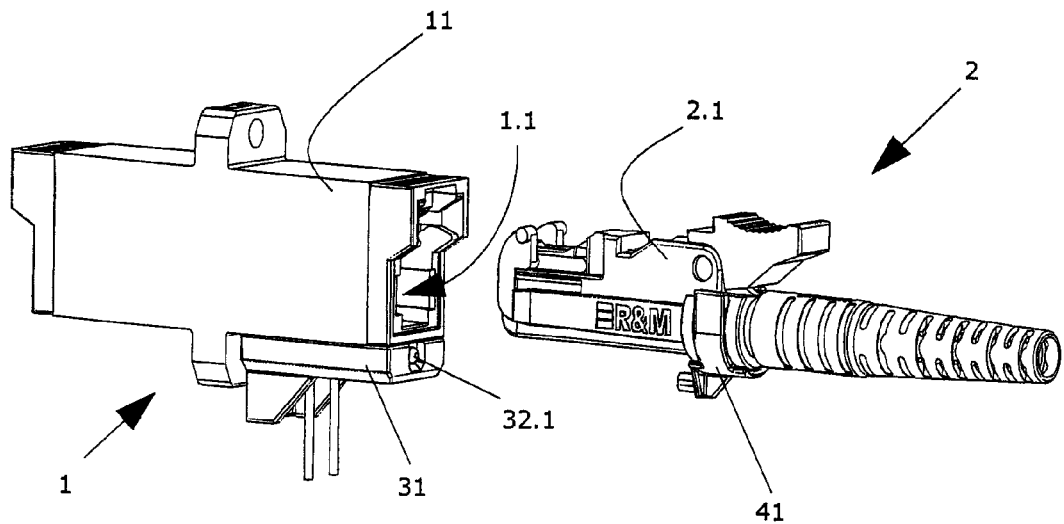
FIG. 1 is a perspective view of a coupling part and plug part, designed according to the invention, of a plug connector of the type LSH.

The plug connector system drawn in FIG. 1 comprises a socket part, adapter part or coupling part 1, and a plug part 2. It is designed according to the type LSH in the represented embodiment, and comprises locking means, with which a high-tensile locking connection may be created between the plug part 2, and the socket part, adapter part or coupling part 1. These locking means, means for releasing the locking connection, a ferrule, means for guiding the ferrule, means for mechanically coding or colour coding, as well as in each case a protective flap of the socket part, adapter part or coupling part 1, and of the plug part 2, are know per se and are not described here. Further information may of example be found in the document EP 0 570 652.

A switch element 31 is attached on the outer side on a housing 11 of the socket part, adapter part or coupling part 1. This element 31 cooperates with a corresponding passive element 41, which is present on the plug part 2 or—as in the drawn embodiment—is fastened on this. The switch element 31 comprises an actuation projection 32.1 which is deflected by the passive element 41 against a spring force, when the plug part 2 is inserted into the socket part, adapter part or coupling part 1.

That region of the plug part 2 which in the inserted condition of the connection, is introduced into an inner space 1.1 (socket opening) of the socket part, adapter part or coupling part 1, is generally called a "plug portion" 2.1. It is evident from FIG. 1, that the passive element 41 is present at a location of the plug part 2, which is different to the plug portion 2.1. This feature permits the compatibility of the solution according to the invention, with existing standards, and the capability of being retrofitted, and the actual standardised region of the socket opening 1.1 and the plug portion 2.1 need not be modified.

Figure 2A:
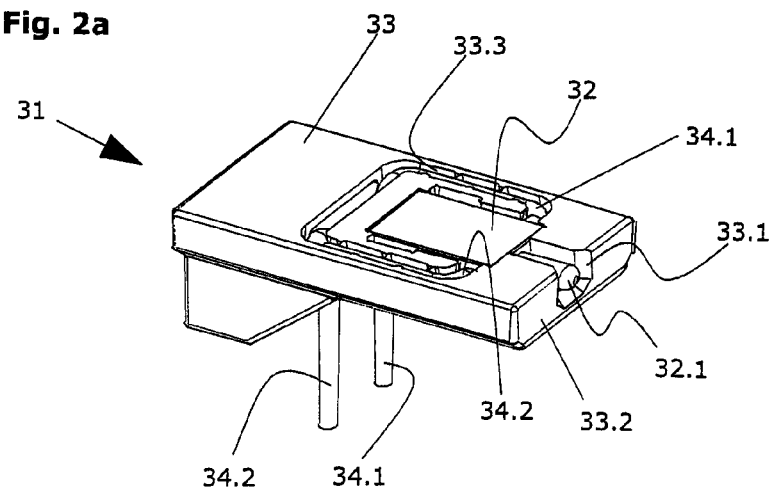
FIG. 2a is a perspective view of a switch element with a microswitch and switch fastening, said element able to be assembled at a later stage.

FIG. 2a shows the first element of the switch device indicated as a switch element 31, in a more detailed manner. The switch element 31 comprises a non-locking, mechanically actuated switch (micro-switch, push-button switch) 32. The actuation element 32.1 is designed as an actuation projection (push-piece) of the switch 32. The switch is held in a switch fastening 33, which for its part may be fastened on the socket part, adapter part or coupling part 1. Within the switch fastening 33, the switch 32 is positioned such that the actuation element 32.1 is countersunk, i.e. is located in a complete length within an opening 33.1 in the switch fastening 33, and at the end-side does not project beyond an end-face 33.2 of the switch fastening 33.

The switch comprises an electrical output, which here is formed by two laterally departing cables 34.1, 34.2, which are led through cable guidance grooves 33.3 of the switch fastening, and are led away towards the lower side of the switch fastening 33 through corresponding openings (not shown in the figures). An electrical connection between the two present contacts which are led out, may exist or be interrupted by way of the switch in a manner known per se, for example depending on the switch condition. This information is utilised in a control of the radiation source, which is remote to the socket part, adapter part or coupling part 1, in order to permit this to operate with full power or a reduced power, or not at all.

Figure 2B:
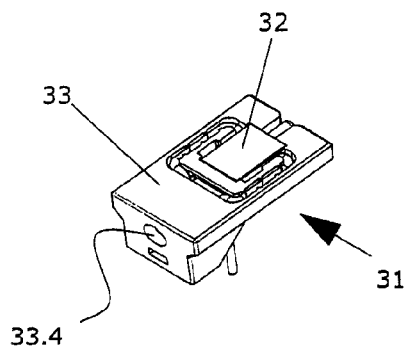
FIG. 2b is a further perspective view of the switch element.

In the shown embodiment, the switch element 31 comprises a fastening hole 33.4 as shown in FIG. 2b, and this fastening hole is present in the switch fastening 33 and by way of which, the switch element 31 may for example be screwed onto the socket part, adapter part or coupling part 1, or on a mounting on which this is assembled.

Figure 3:
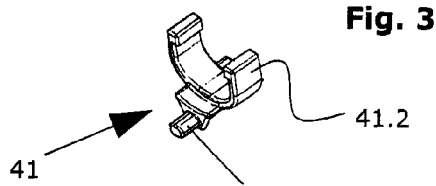
FIG. 3 is a perspective view of a corresponding passive element for the plug part.

The second element of the switch device which is indicated as a "passive element", is drawn in FIG. 3. Since the actuation element 32.1 of the switch element 31 is countersunk, its counter-piece, the counter-projection 41.1, is designed in a pin-like manner and projects into the opening 33.1 given a closed plug connection. The passive element further has a sleeve-like portion 41.2 for clipping onto the plug part 2.

In contrast to the drawn embodiment, the passive element 41 and/or the switch fastening 33 may be designed as one piece with the plug part 2 or the socket part, adapter part or coupling part 1.

The embodiment described by way of FIGS. 1 to 3—as well as other embodiments with functionally similar switch means—have the advantage that the actuation element 32.1 is only actuated when the plug part 2 is completely inserted. A plug part which has only been partly inserted does not trigger the switch. This entails an increased security, and minimises the time during which the radiation acts on the plug connector, without being coupled into a lightwave guide in a correct manner.

Figure 4:
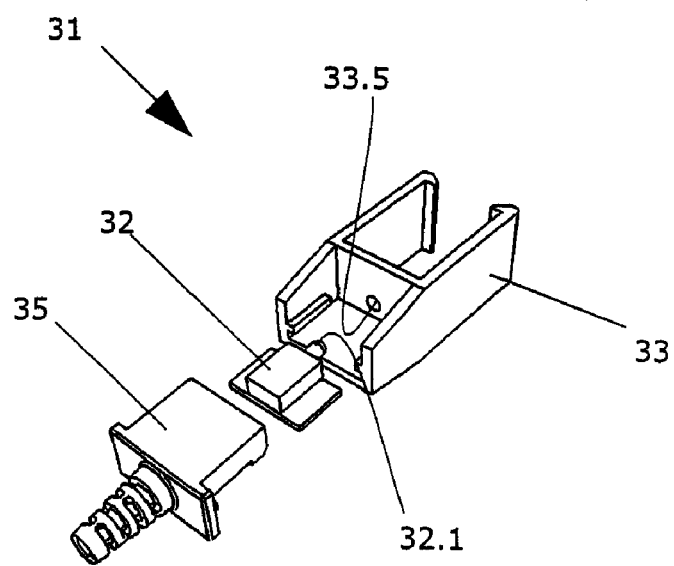
FIG. 4 is an exploded perspective view of a protective device with flap detection.

A protective device which is an alternative to the FIGS. 1 to 3 is drawn in FIG. 4. This is based in the fact that the actuation element 32.1 is actuated by the protective flap (not drawn), which is arranged in the inside of the LSH socket part, LSH adapter part or LSH coupling part, and which is displaced against a spring force by introducing the plug part 2 into the socket opening 1.1. For this purpose, the switch 32 is arranged in a "vertical" manner, which is particularly clearly seen in FIG. 5, i.e. the actuation element 32.1 is displaced in the radial (here vertical) direction with respect to the plug axis.

The switch element 31, which together with the protective flap, forms the switch device, apart from the switch 32, yet comprises a switch fastening 33 with sleeve-like fastening arms 33.6 and a cable lead-off 35. The actuation element 32.1 projects through an opening 33.5 in the switch fastening, and an opening (not shown) in the socket housing 11, into the inner space and is actuated by the protective flap, when this bears completely on the inner wall which lies at the bottom in the drawn configuration (FIG. 5).

With this embodiment too, the compatibility with existing plug types/optical plug connector systems—as here the LSH-type—is ensured, and moreover the ability to be retrofitted is also given. With this embodiment, the plug part 2 does not need to be substantially modified in any manner, which is in contrast to plug parts according to the state of the art.

The switch fastening 33 in this embodiment too, instead of the sleeve-like fastening arms, may comprise a fastening hole for screwing on the switch fastening. The complete width of the plug connector is then not necessarily larger than that of a socket part, adapter part or coupling part according to the state of the art, and one may use panels with socket parts, adapter or coupling parts which are arranged densely next to one another.

Figure 5:
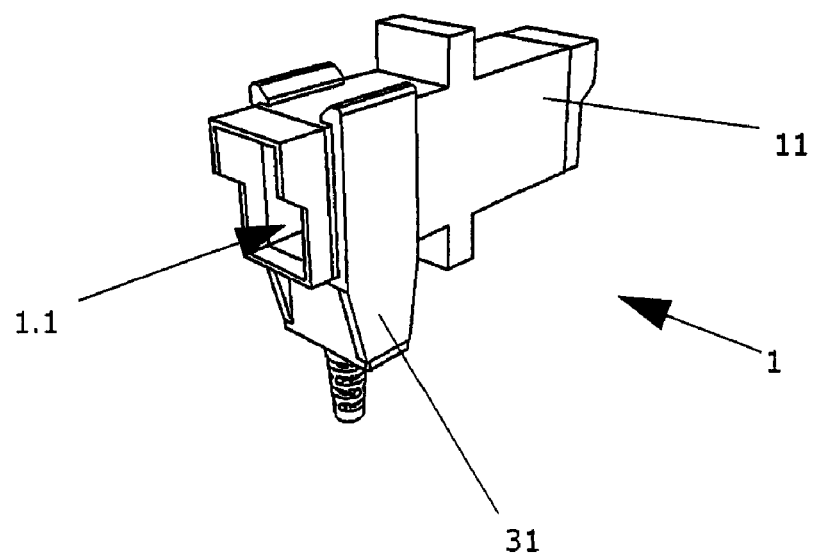
FIG. 5 is a perspective view of the protective device according to FIG. 4 in the assembled condition.

What the embodiment of FIGS. 4 and 5 and that of the previous figures have in common, is that the switch device comprises a measurement probe (here: the actuation element) which is arranged completely outside the inner space, at least in one of the switch conditions.

The invention accordingly also relates to an optical plug connector system, which comprises a socket part, adapter part or coupling part, with a socket housing, as well as comprising a plug part, wherein an inside of the socket housing defines an inner space, into which the plug portion 2.1 of the plug part 2 may be introduced, by which means a releasable plug connection may be created between the socket part, adapter part or coupling part, and the plug part 2, further comprising a switch device, by way of which a radiation power led to the plug part 2 and/or to the socket part, adapter part or coupling part, may be reduced or cut off when the plug connection is released, which is characterised in that the switch device comprises a measurement probe which is arranged outside the inner space, in at least one switch condition.

Figure 6:
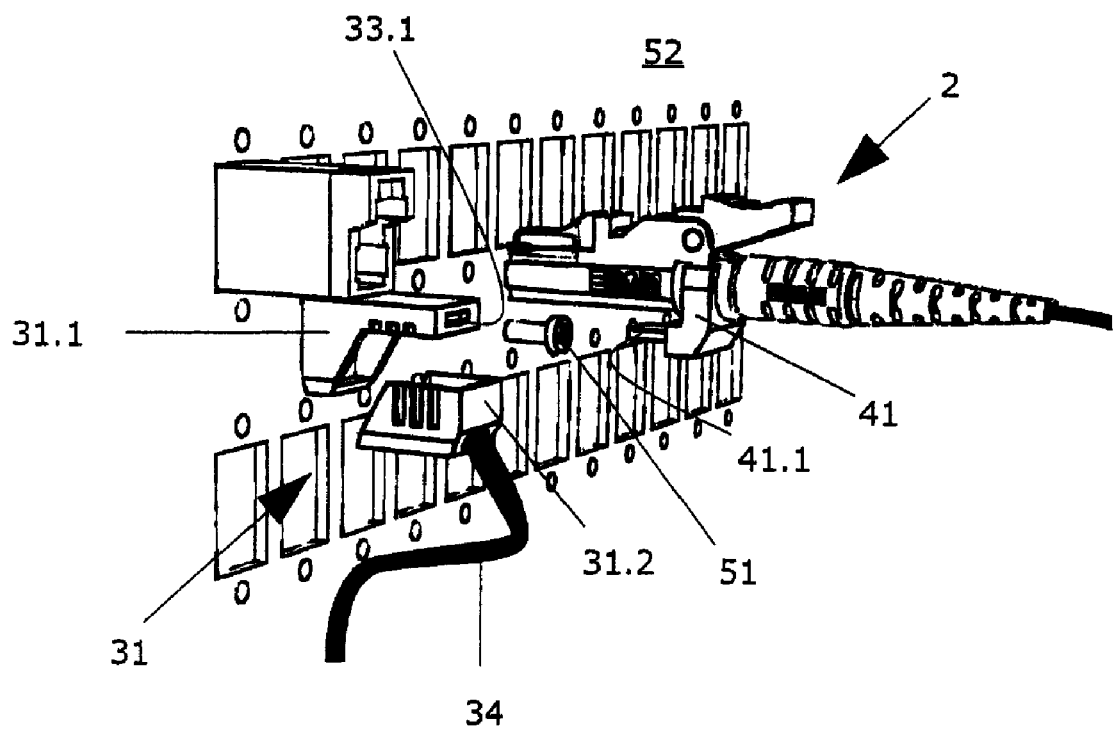
FIG. 6 is a perspective view of the plug connection and the protective device.

FIG. 6 shows a variant of the optical plug connector and protective device system according to the invention. According to this variant, the switch element 31 comprises a support element 31.1 and a clip element 31.2. The support element 31.1 may be fastened on the outer side on the socket housing and/or—in the shown embodiment, bearing on the housing on a panel 52—here with the help of a screw 51. The clip element 31.2 comprises the switch device and at the end-side is fastened on the electrical cable 34 which comprises conductors, which are in contact with the exits of the switch device in the operating condition. The clip element 31.2 may additionally be screwed to the support element 31.1 for the purpose of an increased safety. The wiring is preferably such that the radiation power is always cut-off or reduced, when the conductors of the cable 34 have no contact with the switch.

The two-part design of the switch element 31 according to FIG. 6 is advantageous with regard to the assembly.

Although all drawn embodiments relate to the plug type LSH, a corresponding adaptation to other plug types may be accomplished without further ado within the framework of activities of the man skilled in the art.

Other switches, for example contact-free switches, may be used instead of the drawn microswitch 32.

What is claimed is:

1. A retrofitting set for retrofitting a protective device to a standardized passive optical plug connector system, which optical plug connector system includes: a passive socket part, adapter part or coupling part, the socket part, adapter part or coupling part comprising a socket housing; and a passive plug part, comprising a plug portion, wherein an inside of the socket housing defines an inner space, into which the plug portion may be introduced, by which means a releasable plug connection may be created between the socket part, adapter part or coupling part, and the plug part, the retrofitting set comprising:

a switch device, including a first element shaped to fit onto an outside surface of the socket part, adapter part or coupling part and to be fastened thereto, and the switch device including a second element being shaped to fit to an outside surface of a portion of the plug part and to be fastened thereto, which portion is different from the plug portion, wherein the switch device may be actuated in that the first and the second element cooperate, the retrofitting set further comprising electric wiring connected to the switch and being operable to transmit a switching state to a control of a remote radiation source, whereby the switching device is operable to reduce or switch off a radiation power led to at least one of the plug part and the socket part, adapter part or coupling part, when the switch device is actuated by the plug connection being released.

2. The retrofitting set according to claim 1, wherein the first element of the switch device comprises a non-locking, mechanically actuatable switch with an actuation element, which is displaceable against a spring force to be actuated by the second element.

3. The retrofitting set according to claim 2, wherein an actuation element on the first element of the switch device is axially displaceable with respect to an axis of the plug part.

4. The retrofitting set according to claim 3, wherein the actuation element is arranged countersunk in an opening, and wherein the second element comprises a counter-projection, which projects into the opening, in the inserted condition, of the plug part.

5. The retrofitting set according to claim 2, wherein the switch is a microswitch with a microswitch housing and an electrical output.

6. The retrofitting set according to claim 1, wherein the switch device comprises at least one of a Hall element, a radio frequency identification device and an optical or mechanical presence recognition device.

7. The retrofitting set according claim 1, wherein the switch device is based on transistor-transistor logic.

8. The retrofitting set according to claim 1, wherein the first element comprises two parts, wherein a first one of the two parts is shaped to be fastened on the socket housing or a panel.

9. The retrofitting set according to claim 8, wherein a second one of the two parts comprises the switch device, is fastened on an electrical signal cable, and is shaped to be fastened on the first part.

10. The retrofitting set according to claim 1, wherein in the assembled condition of the protective device, all elements of the switch device, at least in one switch condition of the switch device are located completely outside the inner space of the socket housing.

11. The retrofitting set according to claim 1, further comprising an element for actuating the switch device, said element being shaped to fit to the standardised plug part or to the standardized socket housing and attachable thereto, and wherein the element is purely passive and free of components which require an electricity supply.

12. The retrofitting set according to claim 11, wherein the switch device comprises a non-locking mechanical switch, and wherein the element for actuating the switch device comprises a counter-projection for actuating the non-locking mechanical switch.

13. The retrofitting set according to claim 1, being dimensioned such that the protective device may be assembled on plug connector types of the standard LSH.

14. The retrofitting set according to claim 10, wherein in the assembled condition of the protective device, all elements of the switch device, in each switch condition of the switch device are located completely outside the inner space of the socket housing.

15. An optical plug connector system, comprising:
a passive socket part, adapter part or coupling part, the socket part, adapter part or coupling part comprising a socket housing;
a passive plug part, comprising a plug portion, wherein an inside of the socket housing defines an inner space, into which the plug portion may be introduced, by which means a releasable plug connection may be created between the socket part, adapter part or coupling part, and the plug part; and
a retrofitting set that comprises a switch device including a first element shaped to fit to an outside of the socket part, adapter part or coupling part and to be fastened thereto, and the switch device including a second element being shaped to fit to an outside of a portion of the plug part and to be fastened thereto, which portion is different from the plug portion, wherein the switch device may be actuated in that the first and the second element cooperate, the retrofitting set further comprising electric wiring connected to the switch and being operable to transmit a switching state to a control of a remote radiation source, whereby the switching device is operable to reduce or switch off a radiation power led to at least one of the plug part and the socket part, adapter part or coupling part, when the switch device is actuated by the plug connection being released.

* * * * *